US00RE35990E

United States Patent [19]

Greene et al.

[11] E Patent Number: Re. 35,990

[45] Reissued Date of Patent: Dec. 15, 1998

[54] METHOD AND APPARATUS FOR DISPOSING OF WASTE MATERIAL

[75] Inventors: Ralph M. Greene, Richardson; Patrick C. Malone, The Colony, both of Tex.

[73] Assignee: NCE Corporation, Carrollton, Tex.

[21] Appl. No.: 639,288

[22] Filed: Apr. 25, 1996

Related U.S. Patent Documents

Reissue of:

[64] Patent No.: 5,305,697
Issued: Apr. 26, 1994
Appl. No.: 9,224
Filed: Jan. 26, 1993

U.S. Applications:

[63] Continuation of Ser. No. 804,474, Dec. 6, 1991, Pat. No. 5,203,267, which is a continuation of Ser. No. 643,419, Jan. 22, 1991, abandoned.

[51] Int. Cl.[6] ..... F23J 11/00

[52] U.S. Cl. ..... 110/345; 110/215; 432/72

[58] Field of Search ..... 110/345, 347, 110/211, 216, 217; 432/72

[56] References Cited

U.S. PATENT DOCUMENTS

| | | | |
|---|---|---|---|
| Re. 34,298 | 6/1993 | Gitman et al. | 431/5 |
| 4,078,503 | 3/1978 | Von Dreusche | 110/208 |
| 4,101,632 | 7/1978 | Lamberti et al. | 423/210 |
| 4,491,093 | 1/1985 | Hoekstra | 122/420 |
| 4,635,566 | 1/1987 | O'Connor | 110/106 |
| 4,635,572 | 1/1987 | Nickel | 110/343 |
| 4,757,770 | 7/1988 | Lisowyj | 110/216 |
| 4,762,074 | 8/1988 | Sorensen | 110/346 |
| 4,779,545 | 10/1988 | Breen et al. | 110/212 |
| 4,788,918 | 12/1988 | Keller | 110/215 |
| 4,793,268 | 12/1988 | Kukin et al. | 110/343 |
| 4,870,910 | 10/1989 | Wright | 110/190 |
| 4,922,841 | 5/1990 | Kent | 110/346 |
| 4,947,767 | 8/1990 | Collette | 110/212 |
| 4,949,652 | 8/1990 | Hadley | 110/215 |
| 4,958,578 | 9/1990 | Houser | 110/246 |
| 4,982,672 | 1/1991 | Bell | 110/346 |
| 5,020,456 | 6/1991 | Khinks et al. | 110/345 |
| 5,050,508 | 9/1991 | Wilson | 110/235 |
| 5,088,424 | 2/1992 | Sardari et al. | 110/344 |
| 5,131,335 | 7/1992 | Spliethoff et al. | 110/345 |
| 5,203,267 | 4/1993 | Green et al. | 110/212 |
| 5,261,337 | 11/1993 | Orita et al. | 110/346 |
| 5,265,544 | 11/1993 | Bigelow et al. | 110/345 |
| 5,620,456 | 4/1997 | Khinks et al. | 110/345 |

FOREIGN PATENT DOCUMENTS

| | | |
|---|---|---|
| 507060 | 7/1992 | European Pat. Off. . |
| 189421 | 7/1989 | Japan . |

*Primary Examiner*—Henry A. Bennett
*Assistant Examiner*—Pamela A. O'Connor
*Attorney, Agent, or Firm*—Baker & Botts, L.L.P.

[57] ABSTRACT

A waste disposal system (10) which provides for the destruction of solid and liquid waste materials, through a controlled and monitored flow, from the loading of the material to be processed to the expulsion of clean nontoxic and sterile air and inert solid residue. The system includes; a waste loading module (30), a shredding module (33), an injection module (34), a fist combustion chamber (40), a second combustion chamber (50), a first cooling module (60), an electrostatic module (701), a reducing catalyst module (70), an oxidizing catalyst module (80), a liquid filtering module (90), a neutralization module (100) and second cooling module (101).

43 Claims, 10 Drawing Sheets

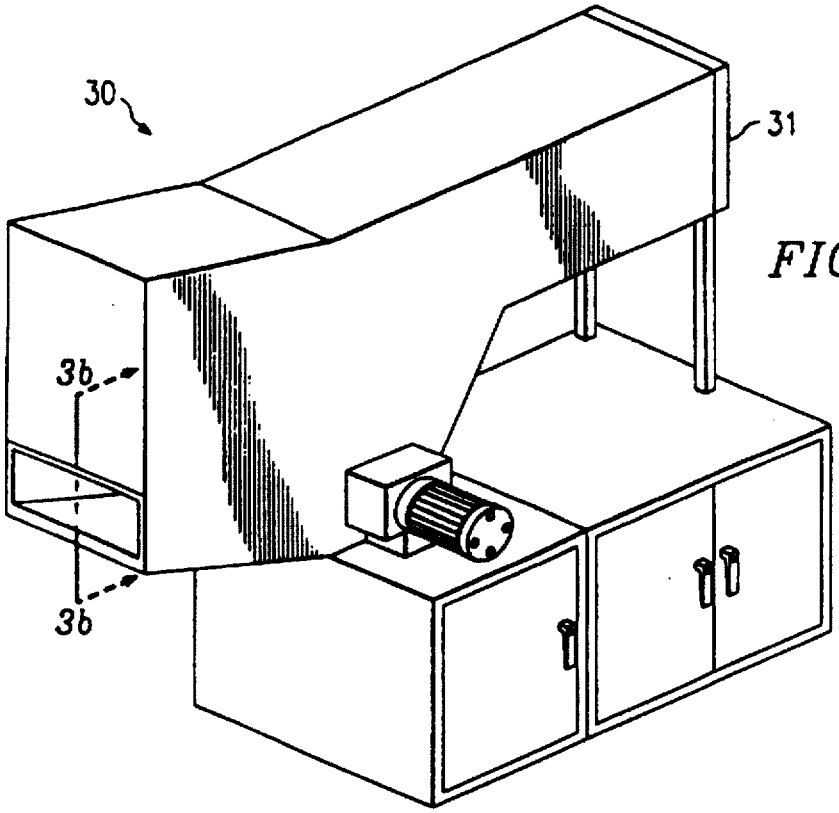
FIG. 3a
FIG. 3b
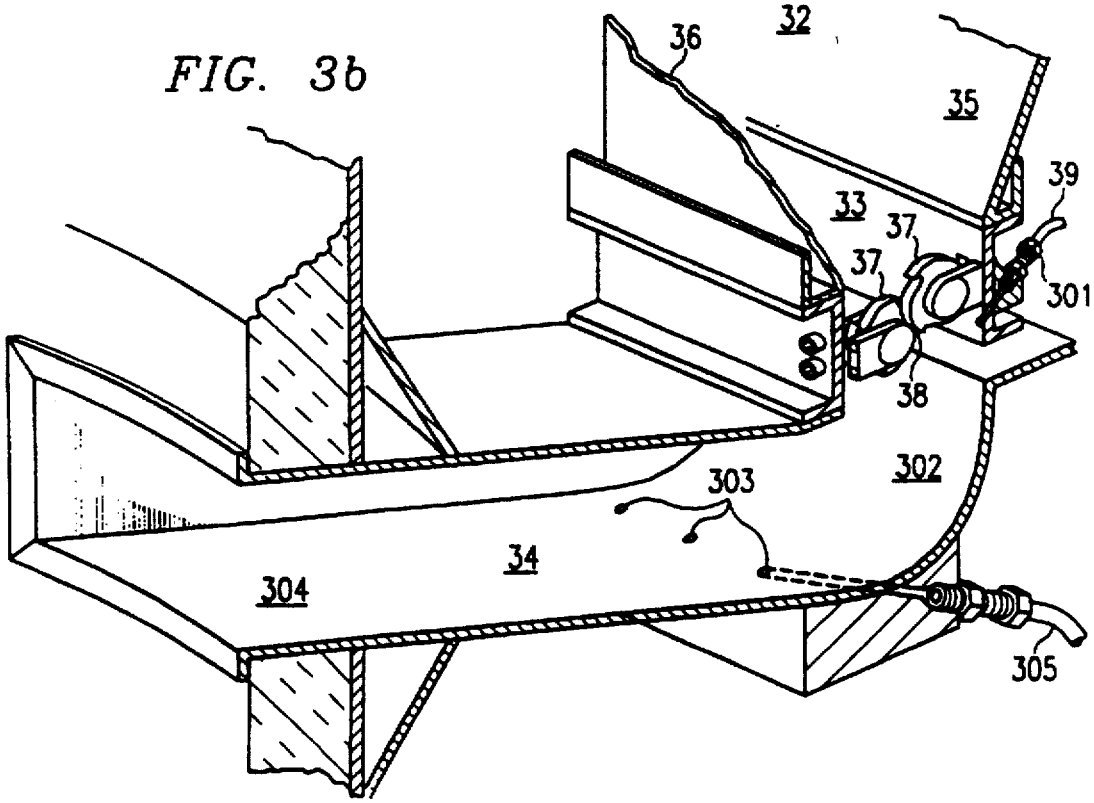

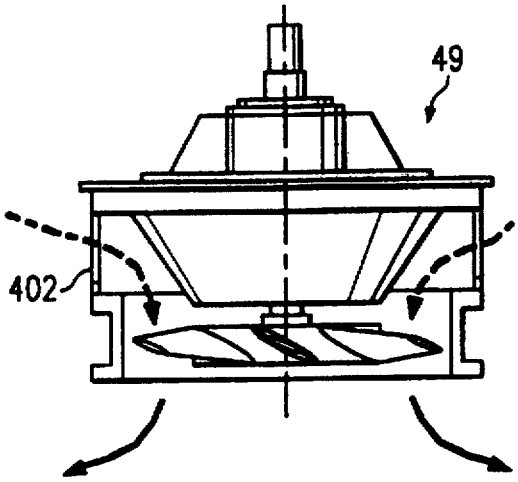
FIG. 4d
FIG. 6
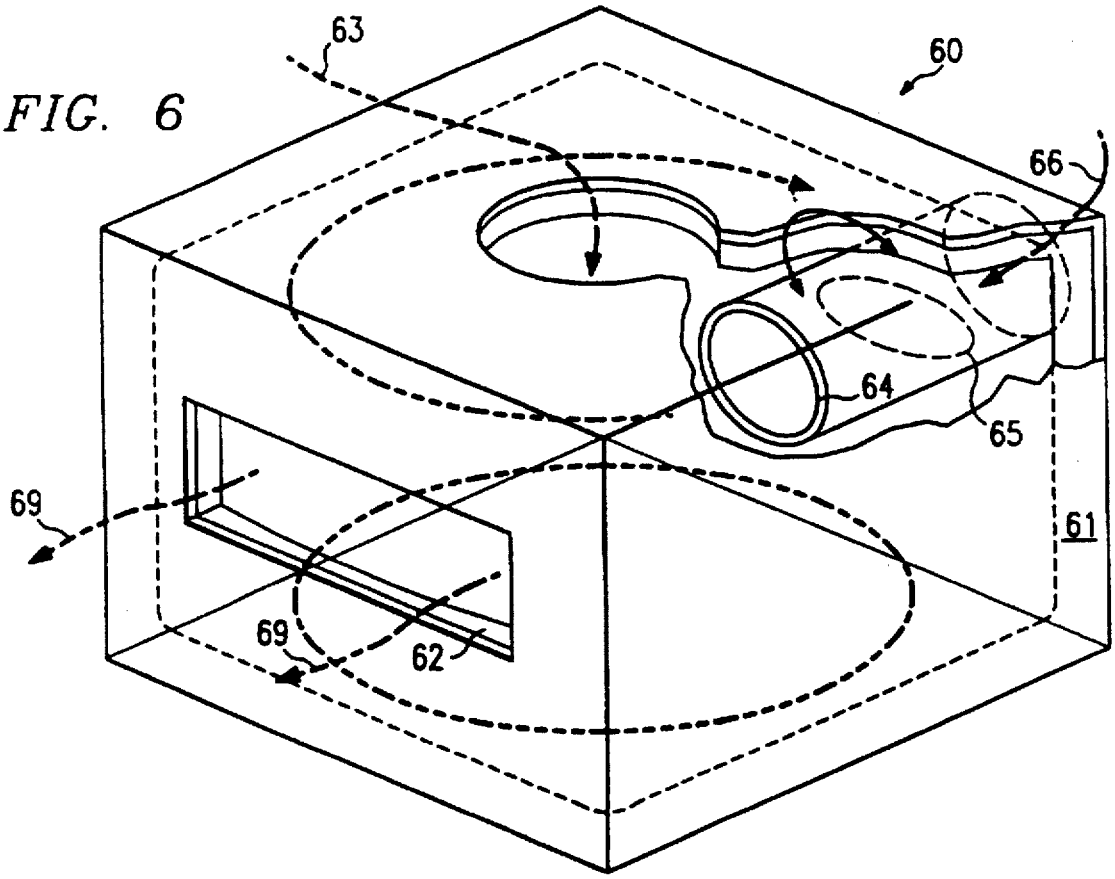

FIG. 8
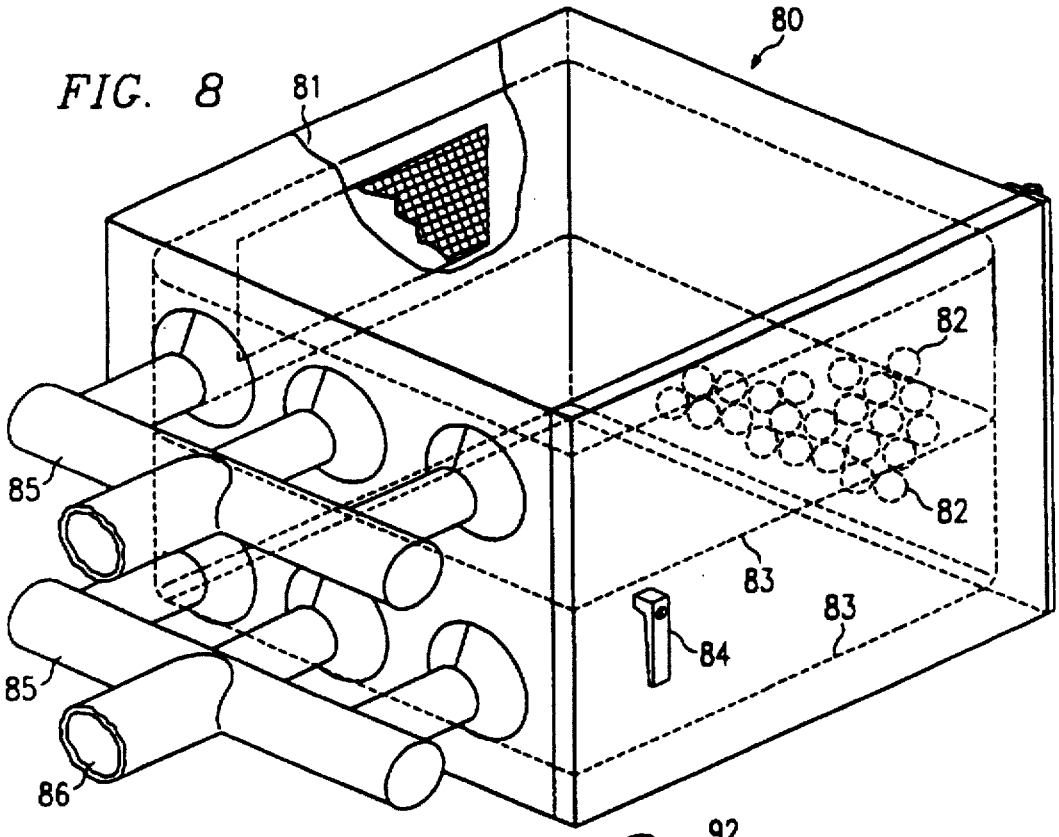
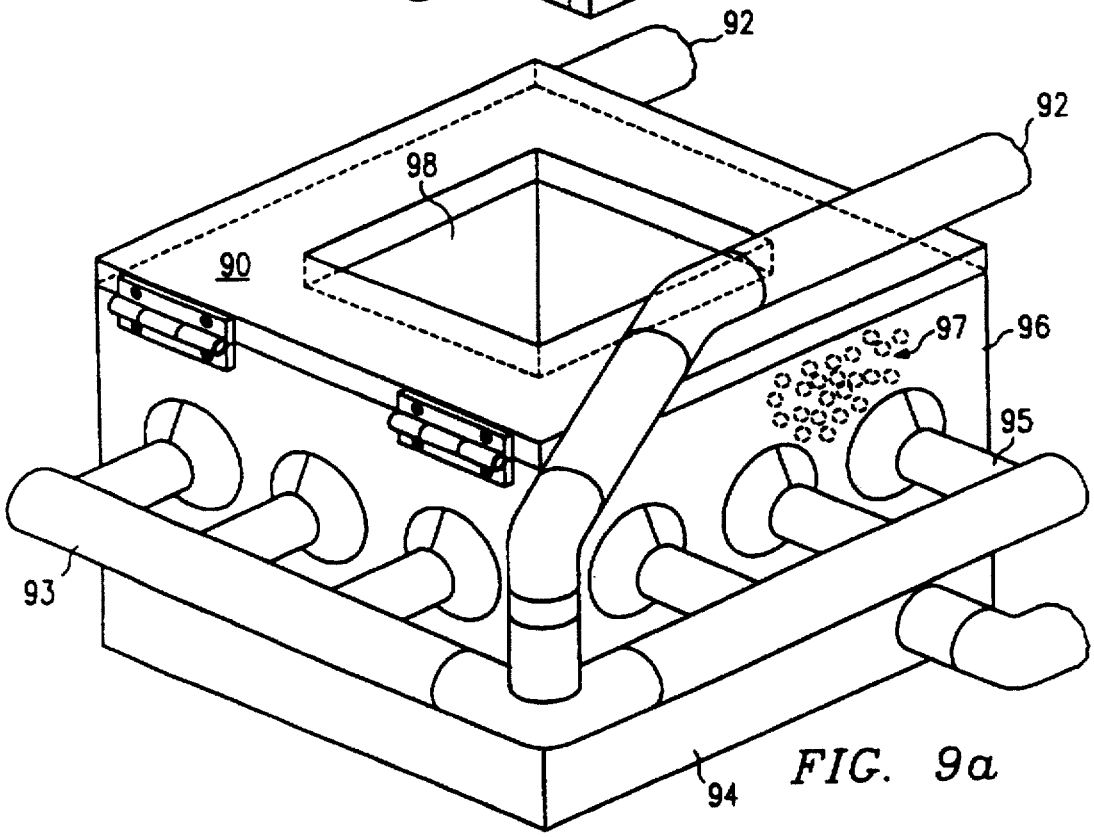
FIG. 9a

METHOD AND APPARATUS FOR DISPOSING OF WASTE MATERIAL

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation application of U.S. application Ser. No. 07/804,474, filed Dec. 6, 1991, and entitled "METHOD AND APPARATUS FOR DISPOSING OF WASTE MATERIAL", now U.S. Pat. No. 5,203,267, which is a continuation of application Ser. No. 07/643,419 filed Jan. 22, 1991, entitled Method and Apparatus for Disposing of Waste Material" by Ralph F. Greene and Patrick C. Malone, now abandoned.

TECHNICAL FIELD OF THE INVENTION

This invention relates generally to waste disposal systems and more particularly to a method and apparatus for disposing of waste materials that employs incineration.

BACKGROUND OF THE INVENTION

There is an increasing concern regarding the safe disposal of trash or waste material from a variety of sources. This trash and waste material varies widely in composition and not only is it hazardous in many instances, the by-products of the disposal system may yield material that is infectious, carcinogenic, toxic and pungent, not to mention bulky and unsightly. Incineration of waste material is an attractive alternative as compared to many other processing methods. The incineration process burns combustible materials, producing various by-products. The by-products include an exhaust made of combustible and noncombustible gases, ash and noncombustible residue. In many instances the by products pose greater potential hazards than the original waste material.

The incineration systems presently in use are basically comprised of a primary combustion module (using an oxygen starved atmosphere) and a secondary combustion module (using an oxygen rich atmosphere) sometimes known as the afterburner. There may also be a variety of filters, scrubbers, recirculation pumps, tanks, flues and fans used in connection with the combustion modules to reduce the potentially hazardous by-products.

The problems associated with the standard types of systems are that they require manual control, monitoring and maintenance. In addition, the by-products of these incineration systems are filtration media, ash, air and water that are invariably polluted with the toxic material present in the original waste, and/or with toxic by-products created during the processing. These pollutants end up in either our landfills, which further pollute the ground and ground water supplies, or in the atmosphere. The air vented through the flues and stacks of these incinerators generally contain oxides of nitrogen ($NO_x$), carbon monoxide (CO), large amounts of carbon dioxide ($CO_2$), in addition to particulate matter and other trace contaminants.

Aside from any immediate harm, it is believed these contaminants contribute to the long term effects of acid rain and global warming. The current incinerator designs and the inherent problems they produce leave a need for a waste disposal system that effectively reduces waste material to inert or otherwise harmless by-products without adversely effecting the surrounding environment.

SUMMARY OF THE INVENTION

The present invention provides for the complete incineration and filtration of hazardous waste material and other types of discarded materials, whether in solid or liquid form, hereinafter referred to generically as "waste material." The method and apparatus of the present invention provides a waste disposal system that effectively reduces waste material to an inert ash and provides a means for removing substantially all the pollutants from the exhaust generated by the incineration of the waste material.

In one embodiment of the invention, a waste disposal apparatus is provided comprised of first and second combustion chambers and a liquid filter. The first combustion chamber incinerates the waste material in an oxygen rich atmosphere to produce ash and exhaust. The second combustion chamber then fires or incinerates the exhaust in an oxygen starved atmosphere. The fired exhaust is next treated by a liquid filter that captures particulate matter contained in the fired exhaust and also chemically treats the exhaust to reduce the quantity of CO, NO, SO and HCL contained in the fired exhaust.

In another embodiment of the invention, a method for disposing of waste materials is provided comprised of three steps. In the first step, waste material is incinerated in an oxygen rich atmosphere to produce ash and exhaust. In the second step, the exhaust is fired in an oxygen starved atmosphere. In the third step, the fired exhaust is filtered in a liquid bath to remove particles contained in the fired exhaust and to chemically treat the fired exhaust to reduce CO, NO and SO.

A technical advantage of the present invention is that a method and apparatus for disposing of waste material is provided that overcomes the disadvantages of the prior art by reducing waste material to inert ash and removing pollutants from the exhaust.

BRIEF DESCRIPTION OF THE DRAWINGS

For a more complete understanding of the present invention and the objects and advantages thereof, reference is now made to the following description taken in connection with the accompanying drawings in which:

FIG. 3a shows a loading chute for preparing waste material prior to incineration that is useful in practicing the waste disposal system of the present invention;

FIG. 3b is a sectional view of the loading chute of FIG. 3a taken along the line 3b—3b in FIG. 3a;

FIG. 4b illustrates the flow of materials and exhaust through the first combustion chamber of FIG. 4a;

FIG. 4d is a sectional view of a circulating fan for use in connection with the present invention;

FIG. 6 is a sectional view of an air cooling module useful in practicing the waste disposal system of the present invention;

FIG. 8 is a sectional view of an oxidizing catalyst module used in connection with the present invention;

FIG. 9a depicts the liquid filtering module for containing the liquid filter used in connection with the present invention;

DETAILED DESCRIPTION OF THE INVENTION

The present invention provides for a waste disposal system that employs incineration and is comprised of several subsystems or modules whose individual functions are combined to yield a reduced amount of undesirable by-products of combustion. The invention is best understood by referring to the accompanying drawings in which like parts are designated with like numerals throughout.

Figure 1:
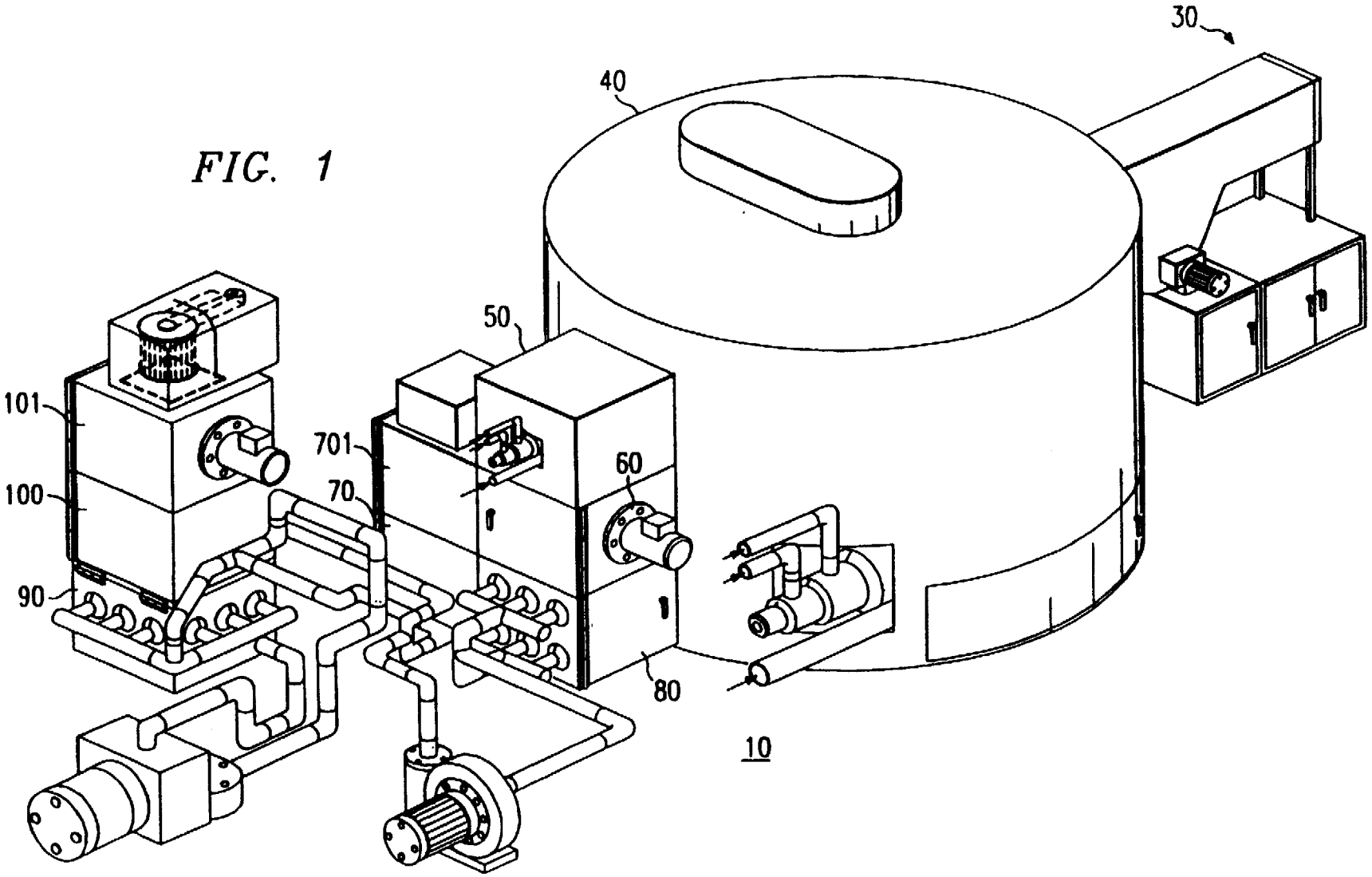
FIG. 1 shows a waste disposal apparatus and system made in accordance with the present invention.

Referring first to FIG. 1, a preferred embodiment of the waste disposal apparatus 10 made in accord with the present invention is shown. Waste disposal apparatus 10 includes loading module 30 for loading waste material into the system. Loading module 30 processes the waste material by reducing it in size, shredding it in the preferred embodiment, and feeding the processed waste material to first combustion chamber 40 for incineration. The waste material is incinerated in first combustion chamber 40 in an oxygen rich atmosphere and reduced to ash and exhaust. The exhaust produced in first combustion chamber 40 is directed to second combustion chamber 50 where the exhaust is fired in an oxygen starved atmosphere.

Continuing with FIG. 1, the fired exhaust is cooled in air cooling module 60 before entering electrostatic module 701. Particles contained in the fired exhaust are removed by electrostatic module 701 before the fired exhaust enters reducing catalyst module 70 where selected by-products of combustion are chemically reduced. From reducing catalyst module 70, the fired exhaust is directed to oxidizing catalyst module 80 where CO is converted to $CO_2$. After leaving oxidizing catalyst module 80, the fired exhaust enters the liquid filter contained in liquid filtering module 90 to remove any additional particulate matter contained in the fired exhaust and to treat the fired exhaust chemically. After passing through liquid filtering module 90, the fired exhaust enters neutralizing module 100 and cooling module 101 before being released into the atmosphere by employment of an induced draft (ID) fan.

Figure 2:
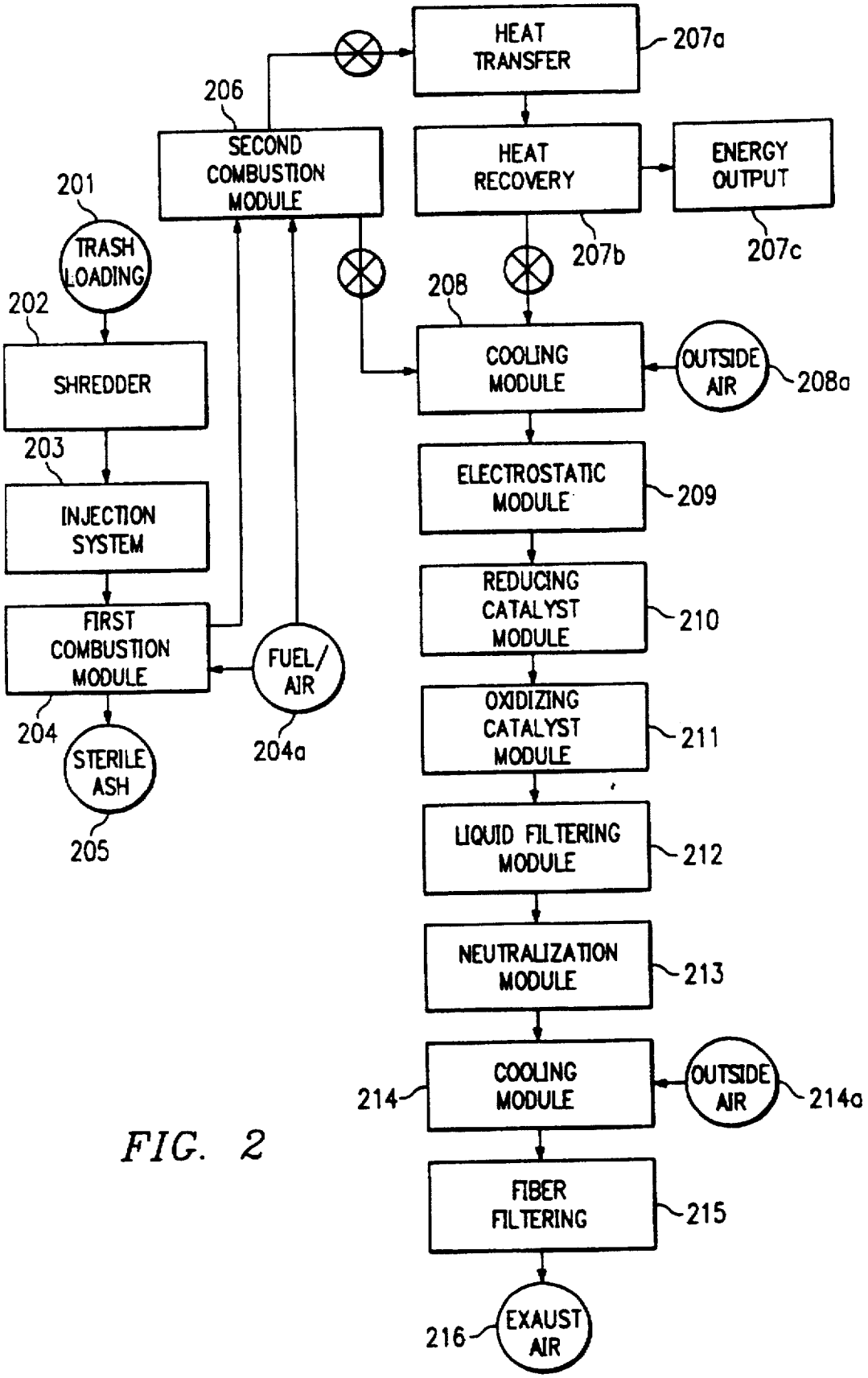
FIG. 2 is a flowchart showing the various steps for performing a method in accordance with the present invention.

Referring now to FIG. 2, a preferred method for carrying out the present invention will be explained in the first step 201, trash or waste material is loaded into the system. In the second step 202, the loaded waste material is shredded to reduce its size and weight before passing the waste material to the first combustion module 204. The shredded material is conveyed by injection system 203 from shredder 202 to first combustion module 204 where it is mixed with fuel and air for incineration in fuel/air mixing step 204a. As a result of the incineration step depicted by at combustion module 204, the waste material is converted to inert sterile ash and exhaust. The sterile ash is removed from first combustion module 204 in step 205.

Exhaust from first combustion module 204 is passed to second combustion module 206 where the exhaust is mixed with fuel ad air and incinerated or fired to produce a fired exhaust. In steps 207a–207c, excess energy is recovered for complimentary purposes, such as to produce steam, by transferring heat (207a) from second combustion module 206 and then recovering that heat (207b) to produce a usable energy output (207c).

In cooling step 208, the fired exhaust is mixed with outside air 208a to reduce the temperature of the fired exhaust before further processing. After cooling step 208, the fired exhaust passes through electrostatic filtering module 209 for removing particles. From electrostatic filtering step 209, the fired exhaust passes to reducing catalyst module 210 for removing oxides of nitrogen. After passing through reducing catalyst module 210, the fired exhaust passes to oxidizing catalyst module 211 for converting CO to $CO_2$. From oxidizing catalyst module 211 the fired exhaust passes to the liquid filtering module 212 for liquid filtering. In the liquid filtering step 212, particles contained in the fired exhaust are removed and it is chemically treated to reduce further CO, NO, SO and HCL. From the liquid filtering step 212, the fired exhaust passes to the neutralization module 213 where acid gasses contained in the fired exhaust are neutralized. In the next step, cooling module 214, the fired exhaust is further cooled before passing to filtering step 215 and then final venting into the atmosphere in step 216.

Referring now to FIGS. 3a–3b, loading module 30 provides a gravity fed or a mechanically activated loading chute 31 for the loading of the waste material into the waste disposal system. The waste material may be placed in combustible containers prior to loading. When loading chute 31 is filled and its door is sealed and locked, a signal is provided to start the system. Loading module 30 is equipped with lock out devices which, when activated, prevent the reopening of the system until its contents have been incinerated, filtered and rendered safe and non-polluting. Referring to FIG. 3b, loading module 30 has a waste entry module 32, a shredder module 33 and an injection module 34.

The shredder module 33 will process the waste material being fed to it into relativity small bits, allowing for rapid combustion. Both the solid shredded waste material and any liquid waste material will be injected into the preheated first combustion chamber 40 (FIG. 1). The method of injection may either be by allowing the material to fall into combustion chamber 40 under the influence of gravity or using jets of air to blow the waste material into the chamber. As will be explained below, it is preferred to blow the waste material into combustion chamber 40 along a trajectory that enhances suspension time of the waste material in the incinerator. Shredder module 33 may provide for a sterilizing treatment to disinfect loading chute 31, waste entry module 32, shredder 33 and injection module 34 after completion of the incineration process or prior to re-opening the loading chute door.

Waste material to be processed is loaded from the exterior of the waste disposal system onto waste entry chute 35. The waste slides down waste entry chute 35 under the influence of gravity, where it enters the shredder 33 and comes to rest in contact with the waste entry chute backwall 36 and the rotary shredder knives 37 of the rotary shredder assembly 38. The rotary shredder assembly 38 is comprised of a wiper assembly and a ganged array of spacers and a ganged array of rotary shredder knives 37. Waste entry chute 35 and waste entry chute backwall 36 are joined to shredder module 33. The ganged array of rotary shredder knives 37 are typically arranged on two counter-rotating shafts and have one or more toothed projections. The waste is pulled through the rotary shredder module 33 by the action of the ganged array of toothed rotary shredder knives 37, where it is shredded and passes through.

Primary air injector 301 is arranged so that pressurized air arriving through the primary air injector air supply lines 39 impinges on the falling shredded waste material and propels that waste along shredded waste chute 302 toward the first combustion chamber 40 (FIG. 4). The shredded waste material above passes over secondary air injectors 303. In like manner, the secondary air injectors 303 are arranged so that the pressurized air arriving through the secondary air injector air supply line 305 impinges on the shredded waste material and further propels it into the waste injection module 34 along and above the waste injection chute 304, and into the first combustion chamber 40. The shredded waste chute 302 is attached to waste injection chute 304, which is a part of the waste injection module 34, and which also is attached to the wall of the first combustion chamber 40.

Figure 4A:
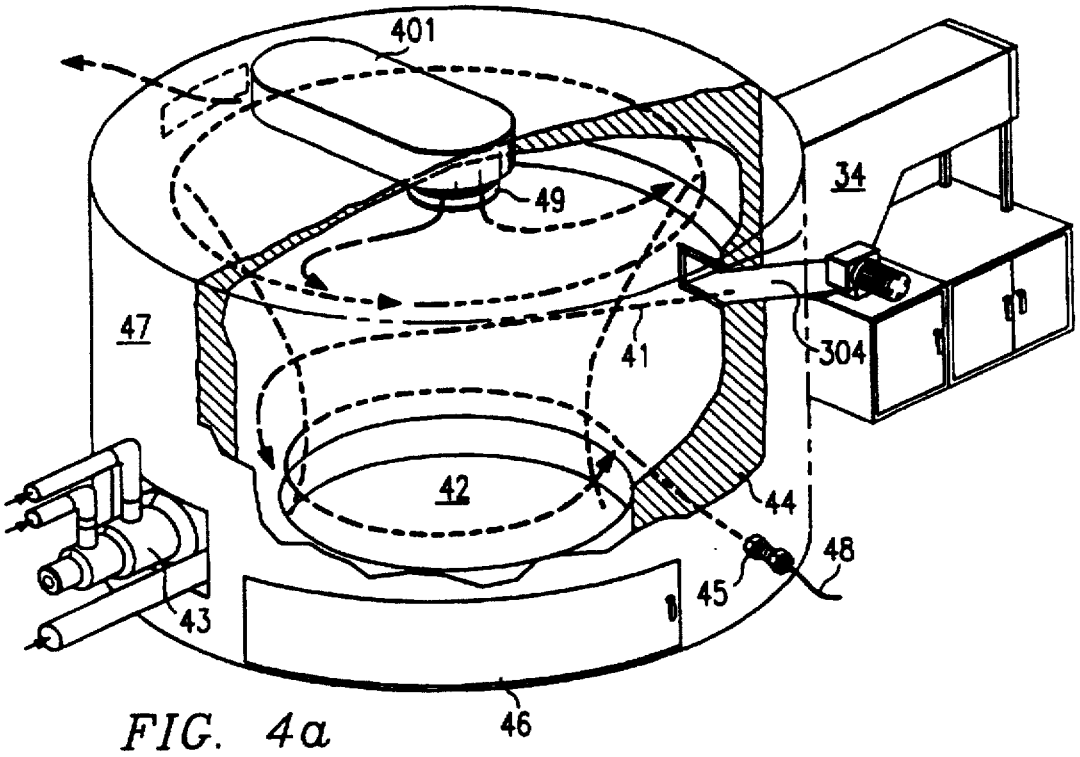
FIG. 4a is a sectional view showing the first combustion chamber used in connection with the waste disposal system of the present invention.

Waste injection module 34 is inclined at such an angle, and the air injectors 301 and 303 are arranged to propel the shredded waste material with sufficient force, that the waste material passes into the first combustion chamber 40 with trajectory 41 (see FIGS. 4a and 4b) that first rises and then falls, giving the airborne shredded waste material a greater residence time in the hot gases of first combustion chamber 40, allowing for enhanced incineration and enhanced outgassing, oxidation, and decomposition of the waste material before it comes to rest on the floor 42 of the first combustion chamber 40 (FIG. 4a).

Figure 4B:
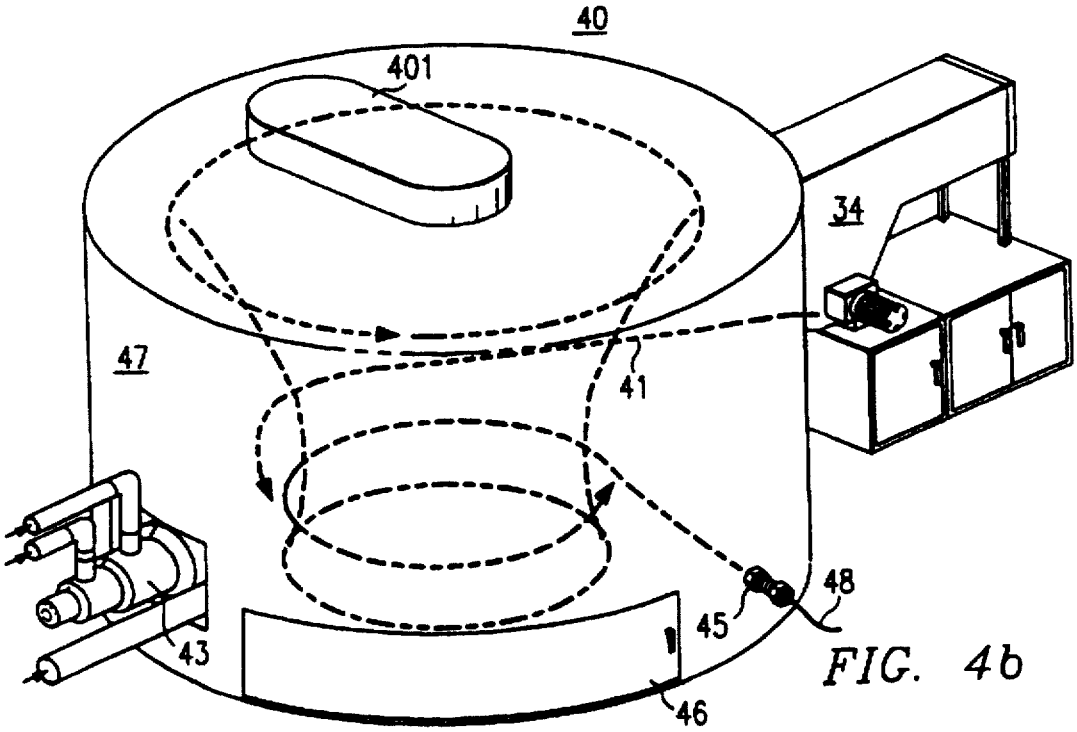
Figure 4C:
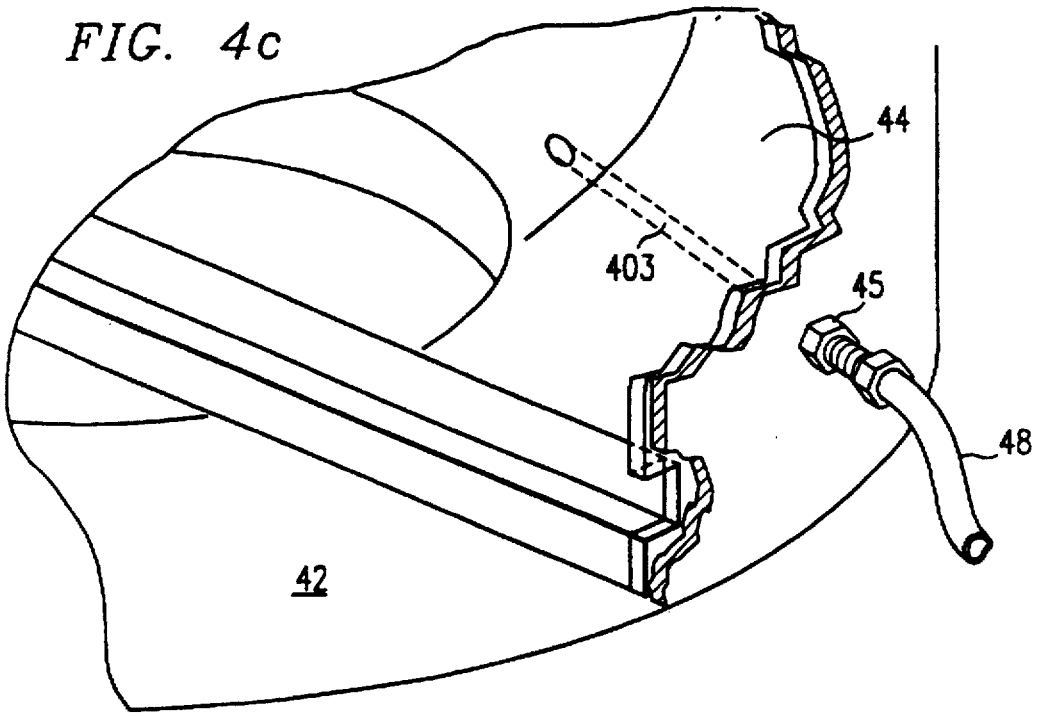
FIG. 4c is a sectional view of the first combustion chamber showing an air nozzle for agitating the contents of the first combustion chamber of FIG. 4a to produce the flow of FIG. 4b.

The waste disposal system of the present invention may have multiple combustion modules. Referring to FIGS. 4a, 4b and 4c, the preferred embodiment of the first combustion chamber 40 is described. First combustion chamber 40 comprises various elements to affect combustion and a preferred air flow pattern that enhances suspension time of the waste material to achieve a more complete incineration. The waste material will be injected into the first combustion chamber 40 which is preheated by the control system when the loading module door has been closed and locked. When locking has been verified by the control system, the control system will take over operation of the system. The control system will ignite the burner system jets 43 in first combustion chamber 40 in a predetermined sequence, monitor and control the temperatures, the gas/air mixtures for proper combustion, the air flow rates and draft control, the chemical composition of the system's air and other operating parameters.

First combustion chamber 40 may be lined with a refractory ceramic material 44. The chamber can be of a shape and size to accommodate a specific charging rate. The first combustion chamber 40 may be capable of batch, intermittent duty or continuous duty incineration.

The configuration of burner system jets 43 in first combustion chamber 40 will determine the direction of the flame/air thrust. The potion and angles of these jets may be adjustable to influence the effect of their thrust on the suspension of any precombusted and combusted waste materials entering or circulating through combustion chamber 40. In addition, there are injectors 45 that inject air under pressure into the first combustion chamber to both disturb accumulations of burning residue on the floor, and to complement the flow patterns of air created by the burner jets 43. The combination of the air flows produced by fan 49, injectors 45 and burner jets 43 produces a complex air flow pattern that enhances the controlled suspension of waste material to get more complete incineration. This controlled suspension, in the preferred embodiment it lasts at least one second and preferably longer, will cause a more thorough combustion, keeping the amount of particulate matter to a minimum, while increasing the processing time of the materials in the combustion chamber. This type of controlled combustion/vaporization will reduce the amounts of ash accumulation within the modules.

The inert sterile ash and noncombustible materials will remain on floor 42 of combustion chamber 40. The floor may be of a design that has a removable and replaceable collection tray 46. If this material has economic value, it may be recycled after its removal from the system.

The wall structure of the first combustion chamber 40, is comprised of an external shell 47, and an interior lining of refractory insulation or ceramic material 44. The waste injection chute 304 is attached to, and passes through, external shell 47, and passes through insulation 44, providing an opening for entry of the shredded waste material into the first combustion chamber 40. The shredded waste material will have a suggested trajectory 41.

The first combustion chamber 40, is heated by one or more burner system jets 43, (see FIGS. 4a and 4b) whose angular position may be adjustable. The burner system jets 43 supply heat energy for combustion, by burning a liquid or gas fuel with oxygen. Air passes into combustion chamber 40 under pressure, either continuously or occasionally, through air supply lines 48 to cyclonic air injection 45 along pathway 403 (see FIG. 4c). The angular position of cyclonic air injectors 45 may be adjustable. This air impinges on the water material, and on the gases already resident in the chamber, with the effect of enhancing the airborne residence time of said waste material.

Non-combustible waste material residue or ash will eventually fall and remain on the floor 42 of combustion chamber 40 for removal as necessary. Refractory insulation on the surface of floor 42 may be protected from chemical reaction with waste residue, and from abrasion due to the removal of accumulated waste residue, by a protective liner.

Still referring to FIGS. 4a and 4b, air circulating fan 49, is driven by air circulating fan motor 401, and is supported by air circulating fan housing 402. (See FIG. 4d). Fan 49 provides an air flow pattern (FIG. 4d) which also enhances the airborne residence time of the the waste material and enhances temperature uniformity inside combustion chamber 40.

Figure 5:
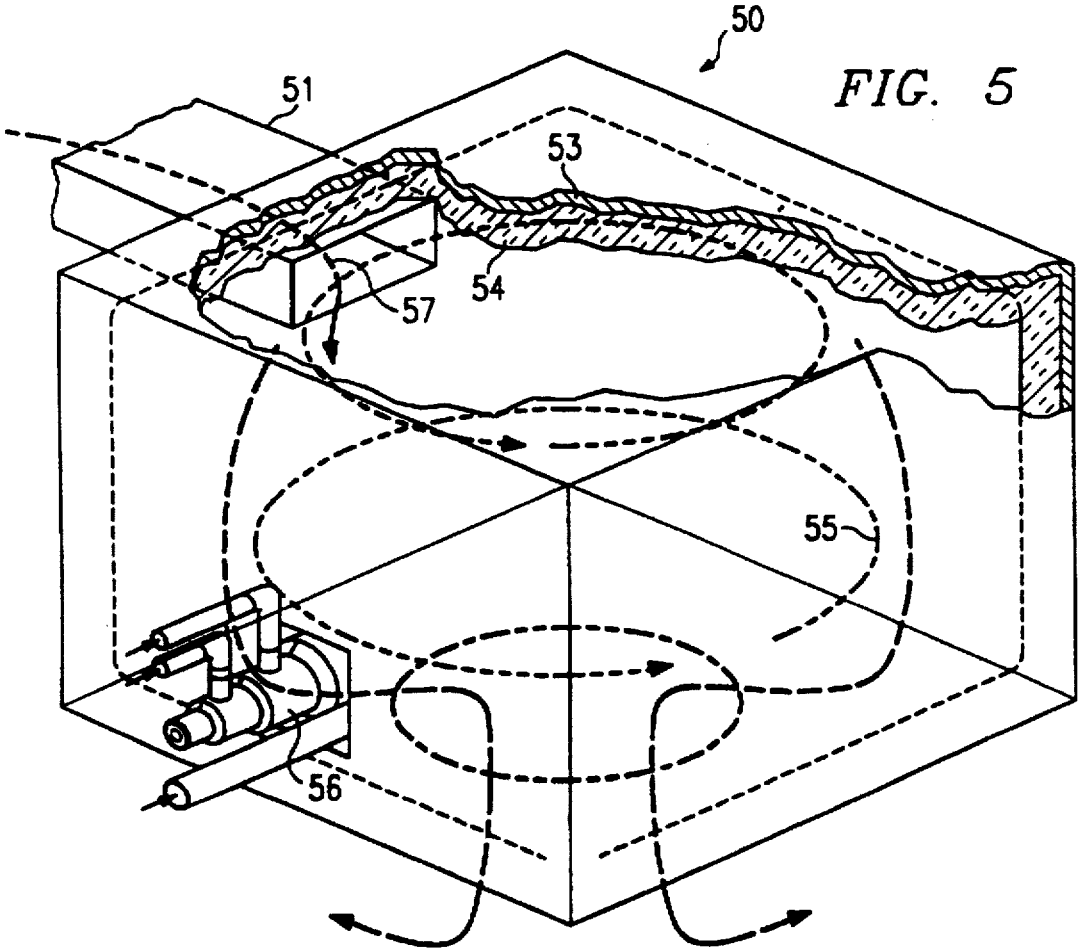
FIG. 5 is a sectional view of the second combustion chamber showing the flow of exhaust through the combustion chamber.

Referring next to FIG. 5, the preferred embodiment of the second combustion chamber 50 is shown comprised of various elements to affect combustion and a preferred air flow pattern. The second combustion chamber 50 chemically reduces the exhaust as it arrives from first combustion chamber 40. The heated exhaust, which may include gaseous vapors and particulate mater, is mixed with air and fired by the action of burner jet system 56 at controlled rates and with a controlled flow to facilitate proper combustion.

The second combustion chamber 50 has an interior that is constructed of refractory ceramic materials. Chamber 50 can have its own burner jet system 56, which may also control the direction of travel of the exhaust. The control system will monitor the temperature, the air/gas mixtures for proper combustion, the air flow rates and draft controls, the chemical composition of the air in the module, and other operating parameters.

The combustion air duct 51 acts as a conduit for the flow of combustion air from the first combustion chamber 40 to the second combustion chamber 50. One end of combustion air duct 51 is attached to the first combustion chamber external shell 47, at an opening in the first combustion chamber refractory insulation 44; and the other end is attached to the second combustion chamber external shell 53, at an opening in the second combustion chamber refractory insulation 54. The flow of exhaust from the first combustion chamber 40 into the second combustion chamber 50 is suggested by dotted lines 57. The angle of attachment of the air duct 51 to chambers 40 and 50 together with the combination of air flow patterns generated by burner system jets 56 enhances the respective cyclonic air flow patterns of chambers 40 and 50. This cyclonic air flow pattern is suggested by dotted arrows 55 and is selected to enhance the burntime of the exhaust in chamber 50.

The second combustion chamber 50, is heated by one or more burner system jets 56, whose angular position may be adjustable. The burner system jets 56 supply heat energy for combustion by burning a liquid or gas fuel. These heated gases impinge on the exhaust already resident in the module, with the effect of enhancing the airborne residence time of the exhaust to produce a fired exhaust. The fired exhaust then passes into the next module for further processing.

Referring next to FIG. 6, the preferred embodiment of the first cooling module 60 is shown comprised of various elements to cool the fired exhaust to a controlled temperature which is advantageous for subsequent processing. The hot fired exhaust from second combustion chamber 50 will travel through first cooling module 60 where it will either (1) be mixed, at controlled ratios, with outside air, or (2) pass through a heat exchanging system allowing some of the energy of the combustion air to be reclaimed. The net effect will be to cool the fired exhaust to appropriate temperatures for subsequent modules.

Fired exhaust passes into the first cooling module 60 where it is mixed and cooled with outside air then exits the module at outlet 69 for further processing. Cooling module 60 is comprised of an external shell 61, refractory insulation 62 and cooling air injection assembly 64. The cooling air injection assembly 64 provides for outside air to enter cooling module 60 in a controlled manner through inlet 66 by varying the position of damper 65 either manually or automatically to control entry of outside air through outside air inlet 66.

Figure 7A:
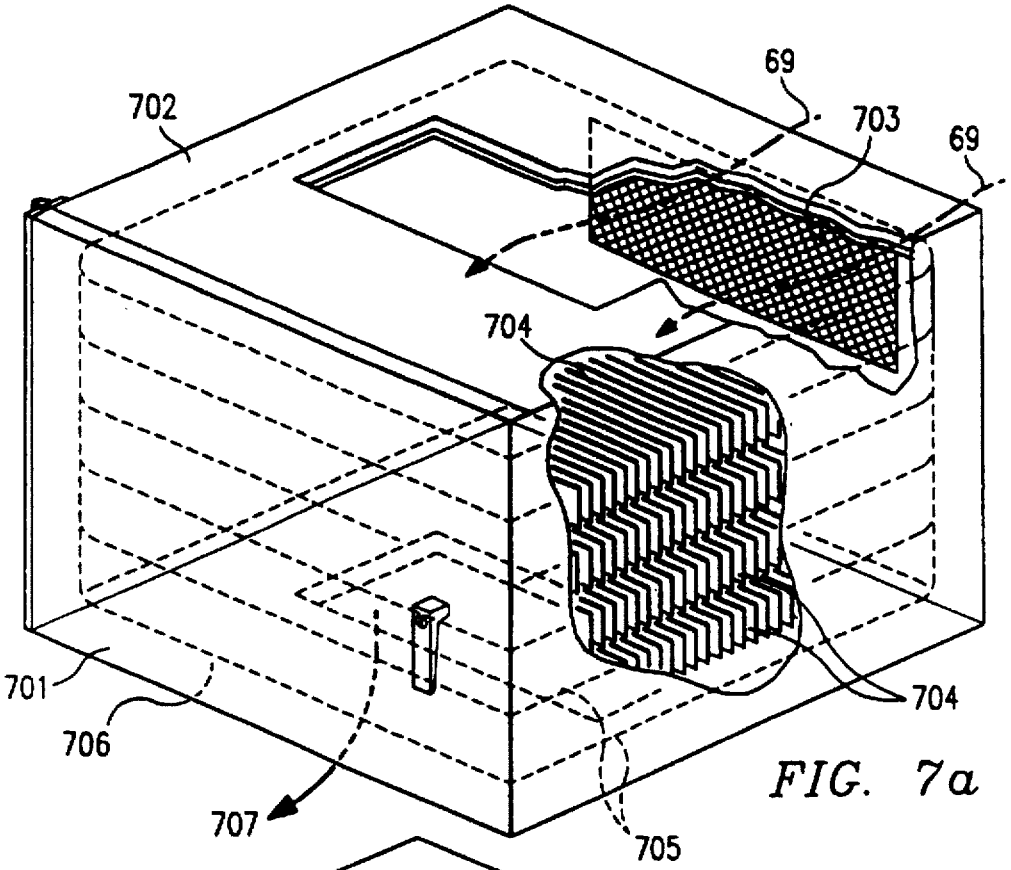
FIG. 7a is a sectional view of an electrostatic filtration module used in connection with the present invention.

Referring next to FIG. 7a, the preferred embodiment of the electrostatic precipitator module 701 is shown comprised of various elements to purify the fired exhaust entering it yielding it more environmentally acceptable. The electrostatic filtration module may be of various designs such that it allows the fired exhaust to pass through an array of grids having alternating positive and negative electrical charges. The fired exhaust includes airborne solid material consisting mainly of carbon flakes (particulate matter) that will pass through this array of grids and take on the electrical charge of a nearby grid. This material will be electrostatically attracted to and captured by a grid of the opposite electrical charge, allowing for further purification of the fired exhaust.

The fired exhaust passes into electrostatic filtration module 701 through a prefilter 703 which mechanically removes large particulate matter from the fired exhaust. Then the fired exhaust passes through an array of ionizing electrodes 704 which impress an electrical charge on particles in the gas stream, then it passes through an array of collecting cells 705 which consist of oppositely charged electrodes that attract and capture the particulate matter that was previously charged by ionizers 704, and finally the fired exhaust passes through an afterfilter 706 that acts to retain in module 701 any captured particulate accumulations by mechanically filtering the fired exhaust. The purified fired exhaust exits the module 701 at opening 707 for further processing. Module 701 is surrounded by external shell 702 which is attached to the first cooling module external shell 61, and to reducing catalyst module external shell 71.

Figure 7B:
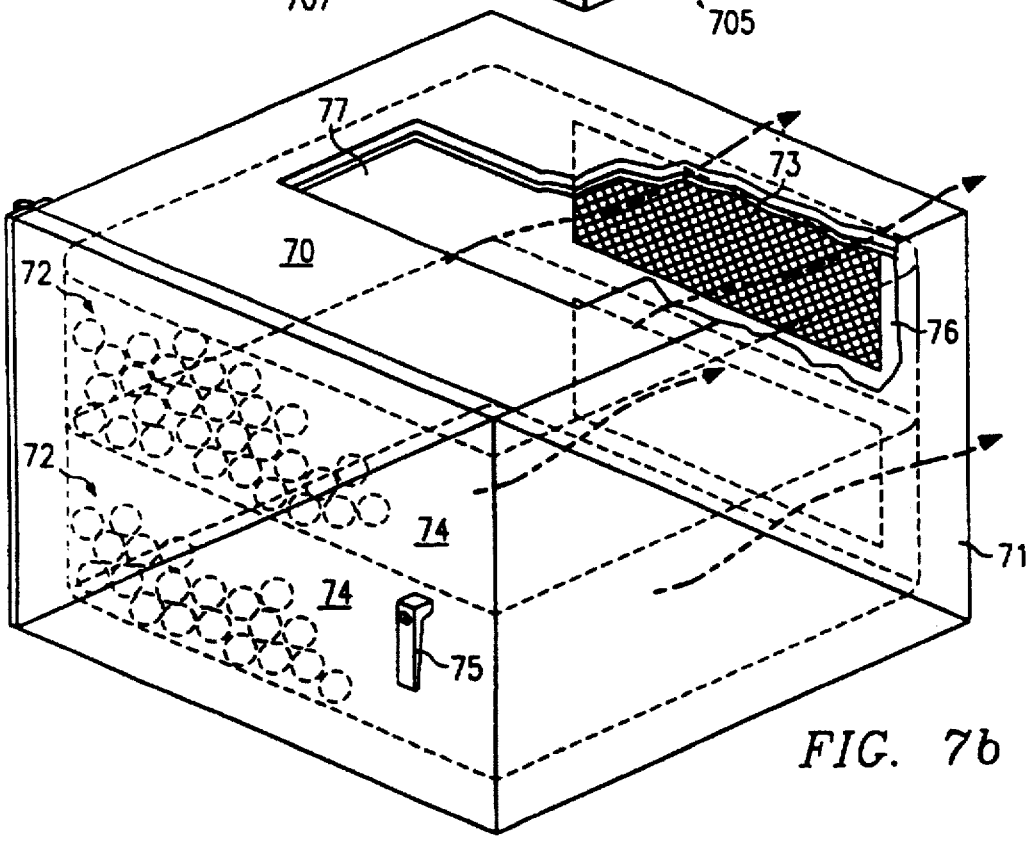
FIG. 7b is a sectional view of a reducing catalyst module used in connection with the present invention.

Referring next to FIG. 7b, the preferred embodiment of the reducing catalyst module 70 is shown comprised of various elements to purify further the fired exhaust entering it yielding a more environmentally acceptable exhaust. The reducing catalyst module 70 has several sub-modules or drawers which are filled with different types and shapes of ceramic adsorptive media such as the NC-300 catalyst available from the Norton Company. The media will be supported in a manner to allow the flow of exhaust through and around the media. Access to the sub-modules or drawers will be denied until such time that the control system deems that access is safe. Media may be selected to remove oxides of nitrogen and other compounds. The chemical composition and other characteristics of the system air in this module 70 are monitored by the control system for a variety of characteristics.

The fired exhaust passes into the reducing catalyst module 70 at opening 77 for purification by the chemical reduction of various gases, particularly oxides of nitrogen, then exits the module at 76 for further processing. Reducing catalyst module 70 is comprised of an external shell 71, which is attached to the external shell 702 of electrostatic module 701 and to the external shell 81 of oxidizing catalyst module 80 (FIG. 8). Fired exhaust passes through the bed of ceramic media 72 where a chemical reduction takes place between the chemical compounds of ceramic media 72 and some oxide gases in the fired exhaust, particularly reducing oxides of nitrogen to diatomic nitrogen. Ceramic media 72 are supported by a mesh material 73. Mesh material 73 has an open structure, allowing for the free flow of fired exhaust through mesh material 73. Mesh material 73 is in turn supported by support drawer 74. Access door 75 allows for removal and replacement of the ceramic media 72 by opening the door and sliding out support drawer 74. The fired exhaust then exits the module at opening 76.

Referring next to FIG. 8, the preferred embodiment of the oxidizing catalyst module 80 is shown comprised of various elements to purify the fired exhaust entering it, yielding the exhaust more environmentally acceptable. The catalytic module 80 contains catalytic materials that would, without entering into any chemical reaction itself, act to initiate or accelerate oxidizing reactions for products of combustion. For example, carbon monoxide is oxidized to carbon dioxide. Module 80 converts harmful compounds to harmless compounds. Appropriate catalysts and catalyst carriers are used for the particular compounds to be altered. For example, oxidizing catalysts could be from the palladium group of elements and deposited on stainless steel or some other suitable support carrier, such as a screen, grid, foil, etc. such as those available from the Catalytic Combustion Corporation of Bloomer, Wis. The catalytic materials are placed in the flow path of the fired exhaust, and may be of such design that the catalytic material is easily removed and/or replaced as part of normal maintenance, regeneration or renewing of the catalyst.

Figure 9B:
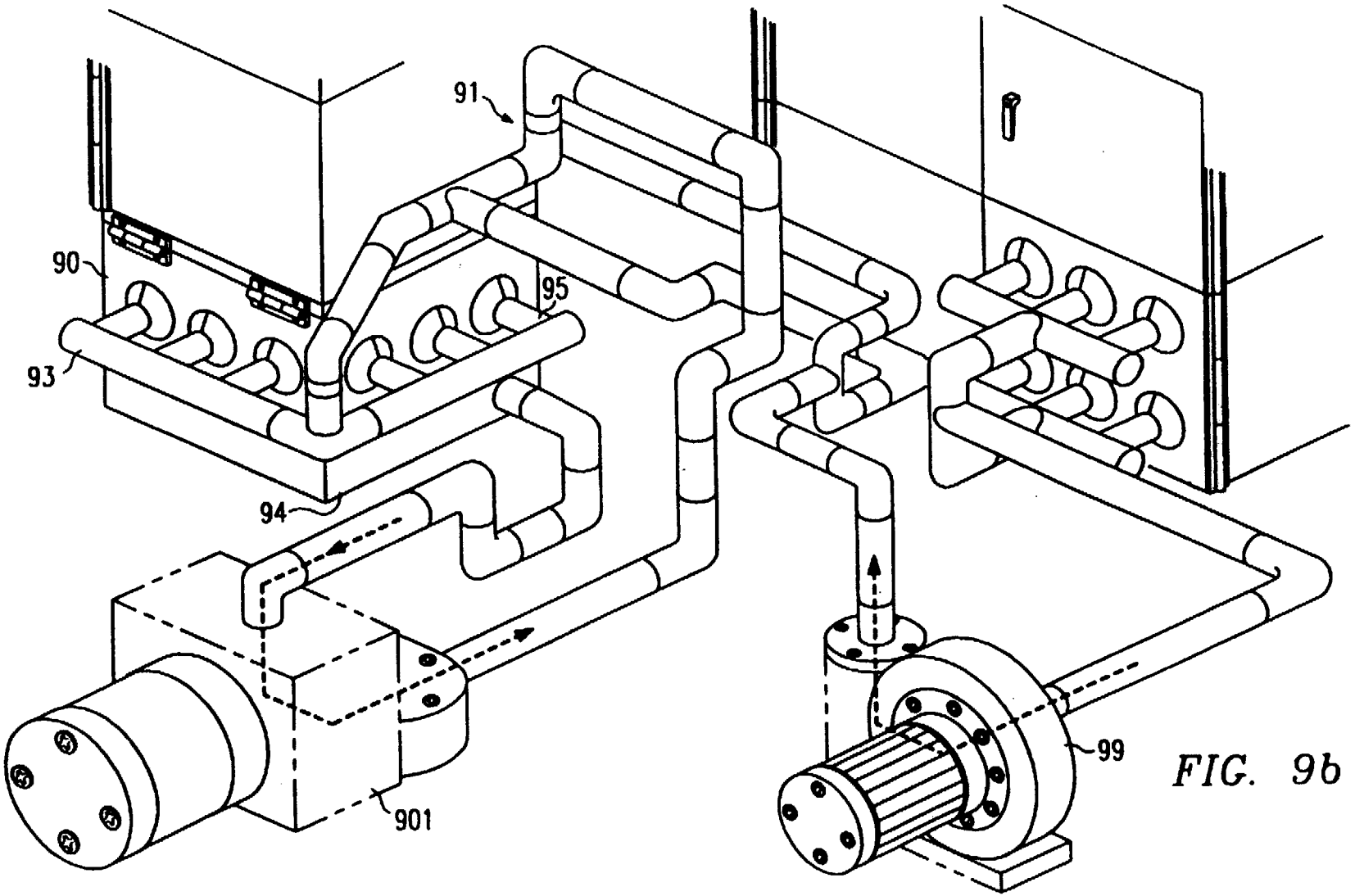
FIG. 9b shows an arrangement for conveying the purified fired exhaust to the liquid filtering module of FIG. 9a and for recirculating and liquid filtering that exhaust.

Fired exhaust passes into the oxidizing catalyst module 80 for purification by the chemical oxidization of various gases, particularly carbon monoxide, then exit the module at 86 for further processing. Oxidizing catalyst module 80 is comprised of an external shell 81, which is attached to the external shell of the reducing catalyst module 71 (FIG. 7b). Fired exhaust passes through the oxidizing catalyst assembly 82 where a chemical oxidation takes place between the chemical compounds of the oxidizing catalyst assembly and some gases in the fired exhaust, particularly oxidizing carbon monoxide (CO) to carbon dioxide ($CO_2$). Assemblies 82 are supported by support drawer 33. Access door 84 allows for removal and replacement of assembly 82 by opening door 84 and sliding out support drawer 83. Purified fired exhaust is collected by collection manifolds 85 then exits module 80 at opening 86 which in turn pass the gases to the liquid filtering module 90 through pump 99 (FIG. 9b).

Referring next to FIG. 9a, the preferred embodiment of the liquid filtering module 90 is shown comprised of various elements to purify the fired exhaust entering it make it more environmentally acceptable. This filtration module may be a type of chemically reactive liquid filtering module or liquid filter. This system may be comprised of pumps, aspirator devices and chemically reactive liquids. Fired exhaust will be combined with the reactive liquid into a froth or foam and injected into a reservoir of the liquid. This module allows for the dissolving of soluble compounds in the fired exhaust, as well as trapping particulate matter. The closed loop circulation of chemically reactive liquids allows for thorough exposure, mixing, cleansing and filtration of polluting compounds within the fired exhaust. The chemically reactive liquids may be in a thickened state which will assist in providing enhanced exposure time to the percolation process.

The liquid filtering module 90 has several types of controllable non-corrosive injection nozzles which are used to direct the flow and create agitation. The looped piping and aspiration pump system of a noncorrosive construction with electronically or manually controlled back flow shut off valves to prevent any chemically reactive liquids front backing up into any other module. The module 90 may be coated with a nonporous, noncorrosive material with easy access clean outs also of a noncorrosive construction.

Fired exhaust passes into liquid filtering module 90 where harmful gases, particularly carbon monoxide (CO), nitrous oxide (NO), hydrogen chloride (HCL) and sulfur dioxide ($SO_2$), are taken into solution and neutralized in neutralizing solution 96. The purified fired exhaust then exits the module at exit 98 for further processing. Liquid filtering module 90 is comprised of an external shell 94 and various other components, and acts as a reservoir for neutralizing solution 96. Fired exhaust passes into mixer 91 (see FIG. 9b) which entraps the gas as bubbles in solution 96 as a gas/liquid mixture 92. Mixture 92 enters manifolds 93 where mixture 92 is forced through nozzles 95 where the trapped bubbles 97 rise to the surface of the neutralizing solution 96 which is contained within external shell 94. Neutralizing solution or liquid filter 96 may be comprised of water and either urea or ammonia. Liquid filter 96 may also include a thickening or jelling agent such as CAB-O-SIL type M-5 available from Cabot Corp. of Tuscola, Ill. Purified fired exhaust collects over solution 96 at the top of liquid filtering module 90, and passes to the next module.

Referring next to FIG. 9b, neutralizing solution 96 exits module 90 and flows into liquid pump 901 where solution 96 is pressurized and forced through mixer 91, while fired exhaust enters air pump 99 where the fired exhaust are pressurized and also forced through mixer 91 creating gas/liquid mixture 92 (see FIG. 9a). The liquid circulation loop is thus closed.

Figure 10A:
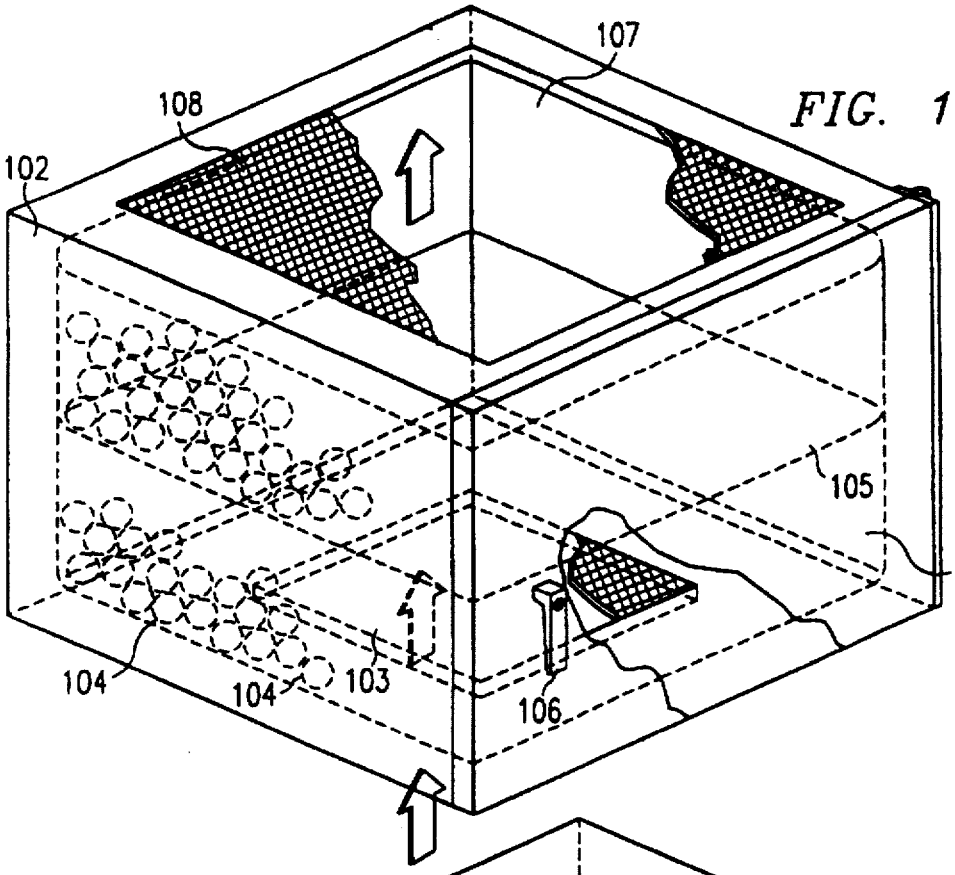
FIG. 10a is a sectional view of the neutralization module shown in connection with the present invention.

Referring next to FIG. 10, the preferred embodiment of the neutralization module 100 is shown comprised of various elements to purify the fired exhaust entering it yielding the gases more environmentally acceptable. Neutralization module 100 has multiple sub-modules or drawers which can contain pellets of alkali- or calcium-based compounds to neutralize acid gases in the fired exhaust flowing through the system. Neutralization module 100 allows for the free flow of fired exhaust through and around the media. It is lined with a material, such as a ceramic, to prevent corrosion of any metal components. The sub-modules or drawers may be removable for maintenance or replacement of the media.

Fired exhaust passes through filter 103 and into the neutralization module 100 for purification by the chemical neutralization of various acid gases, particularly hydrogen chloride, then exits the module at 107 for further processing. Filter 103 mechanically filters the fired exhaust. Neutralization module 100 is comprised of an external shell 102, which is attached to the external shell of the percolation module 90 and to the external shell of the second cooling module 101. Fired exhaust passes through the bed of neutralizing media 104, e.g. calcium carbonate, where a chemical neutralization takes place between the compounds comprising the media and acid gases. Neutralizing media 104 is supported by support drawer 105, having an open structure to allow for the free flow of gases. Access door 106 allows for removal and replacement of the neutralizing media 104 by opening the door and sliding out support drawer 105. Fired exhaust then exits the module at 107 after passing through filter 108 which mechanically filters the fired exhaust.

Figure 10B:
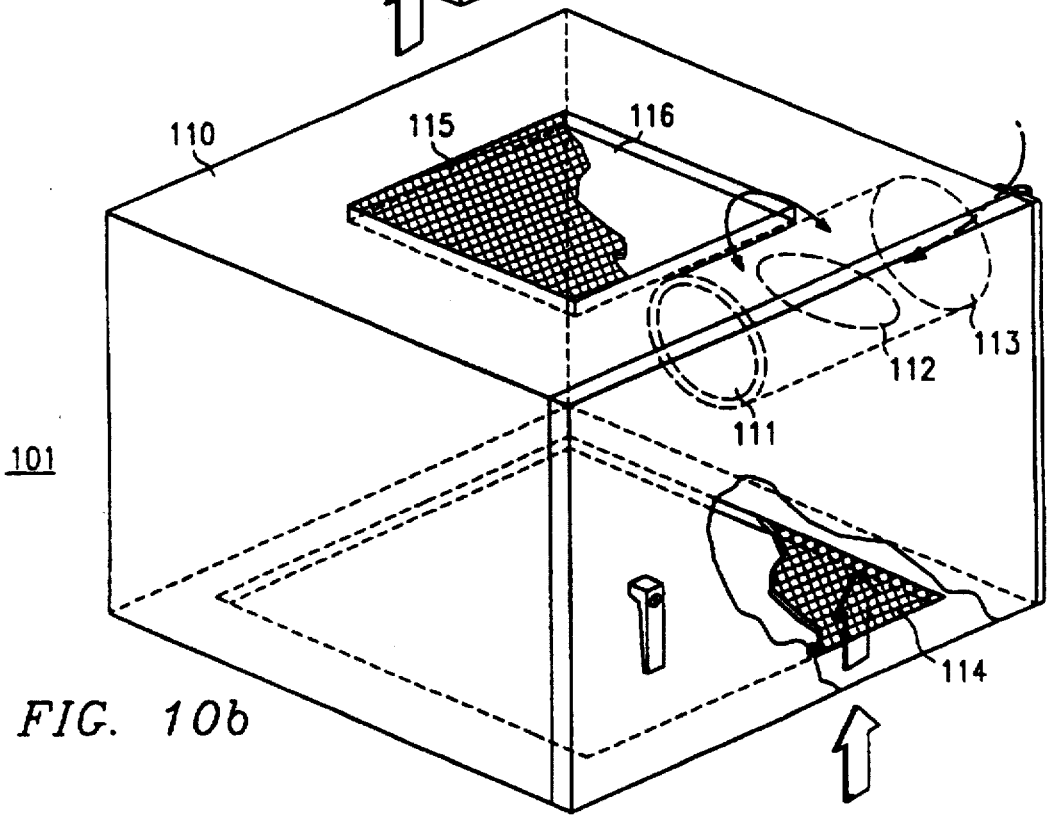
FIG. 10b is a cooling module used in connection with the waste disposal system of the present invention.

Referring next to FIG. 10b, the preferred embodiment of the second cooling module 101 is shown comprised of various elements to cool the fired exhaust to a controlled temperature which approximates ambient outside air temperature and to control and maintain appropriate negative internal air pressure. This cool down module may function much the same as the cool down module described above (see FIG. 6).

Fired exhaust passes into the second cooling module 101 where it is mixed and cooled with outside air, then exits the module at 116. Outside air enters through cooling air damper assembly 113 where its flow rate is controlled by air damper 112, whose position is varied either manually or automatically, then the outside air passes through cooling air inlet 111. Fired exhaust enters module 101 through mechanical filter 114, mixes with outside air, passes through outlet filter 115 which again mechanically filters the exhaust, and then exits module 101 at opening 116. Thus, the mixture of the fired exhaust and outside air can pass into the atmosphere through an ID fan and its damper assembly. The damper assembly can be directed upward at different angles with controlled speed and flow rates. This effectively reduces any possibility that $CO_2$ will be found at ground level in an amount that could be harmful. External shell 110 is attached to neutralizing module external shell 102 and to an induced draft fan housing (not shown). Such a fan maintains a negative internal air pressure which is necessary for the proper functioning of the second cooling module 101.

This system may have optional systems added to it's configuration such as an electrical generation or heating system. This can be accomplished through the coupling of the heated exhaust and a boiler/steam turbine system. The heated exhaust would be coupled with the boilers' tubular network. This allows for the production of steam from the boilers internal circulation of water, which is supplied externally from the waste disposal system and may be controlled by an imbedded computer and data system. Depending upon system configuration, this steam production can be used to drive a steam turbine to produce electrical power or provide steam heat to a variety of other optional devices or systems. The waste disposal system's internal exhaust flow may be routed through the boiler systems tubular network heating the boilers internal water supply then passing through to a cool down module as described in connection with FIG. 6.

The waste disposal system of the invention also includes an imbedded computer and data acquisition system. The purpose of these combined computer systems is the complete monitoring and functional control over all the integrated subsystems that make up the waste disposal system. The imbedded computer and data systems are capable of high speed real time processing of both data and calculations using the most recent processor and coprocessor chip technology, with built in expansion techniques which allows updating as needed. The system has several expansion slots for additional function cards as required by the system's demands, such as environmental regulation changes, systems technology improvements, additional subsystems or optional systems. The computer system may also have several common I/O ports for the sharing or controlling data and/or functions as required by the waste disposal system's configuration. The computer and data systems along with their function cards can have several data acquisition cards which can be determined by the system requirements.

These computer systems support such items as Remote Terminal Units (RTU) which allow for a choice of communication modes and the availability of several types of protocols. Other features include a modem, multitasking multi-drop networking cards, multiple channel analog and digital I/O cards and any other system required signal-processing cards.

Other peripherals such as graphics and video cards, fixed hard drives, floppy drives, optical worm drives, CRT displays, keyboards, extended RAM and ROM slots may be included. There may be other output devices such as plotters and printers. These systems will have redundant electrical power supplied via in-line battery-backed UPS, regulated and filtered, electrical power from an electrical generating system.

These computer systems have programming installed that works with and controls the incinerator system. The imbedded computer/data acquisition system programming also controls all the waste disposal system and it's subsystem or modules. The tasks this programming may control will include sensing of all system and subsystem required parameters, such as but not limited to, temperature, flow, content, levels, adsorption rates, pressures, mechanical and electro-mechanical operation, optical and electro-optical operation, reporting, alarm conditions and all fail safe and monitoring devices on site or from a remote location.

These systems are housed in enclosures constructed of noncorrosive metal with internal shielding to provide for complete isolation from physical contact and ESD damage. Transient voltage suppressors protect the electronics from electrical surges on the power line and field terminal wiring. I/O modules are internally protected from field wiring shorts.

While the present invention has been described with reference to the presently preferred embodiments, it will be appreciated that the invention may be embodied in other specific forms without departing from its spirit or essential characteristics.

Accordingly, the described embodiment is to be considered in all respects only as illustrative and non restrictive. The scope of the invention is, therefore, indicated by the appended claims rather than by the foregoing description. All modifications or changes which come within the meaning and range of equivalency of the claims are to be embraced within their scope.

What is claimed is:

1. A method for disposing of waste material comprising:

(a) incinerating said waste material in an oxygen rich atmosphere to produce ash and exhaust;

(b) firing said exhaust in an oxygen starved atmosphere to produce a fired exhaust; and then (c) filtering said fired exhaust in a neutralized solution to remove particles contained in said fired exhaust and for chemically treating said fired exhaust to reduce harmful gases.

2. The method of claim 1 wherein said harmful gasses comprise one of the following: CO, NO, $SO_2$ or HCL.

3. The method of claim 1 further comprising the step of agitating said waste material and ash during said incinerating step to increase incineration.

4. The method of claim 1 further comprising the step of cooling said fired exhaust.

5. The method of claim 1 further comprising the step of filtering said fired exhaust to remove particles.

6. The method of claim 1 further comprising the step of treating said fired exhaust to remove by-products of combustion contained in said fired exhaust.

7. The method of claim 1 further comprising the steps of agitating said neutralizing solution and mixing said first exhaust with said neutralizing solution during said filtering step.

8. The method of claim 1 wherein the step of incinerating further comprises using a non-stoichiometric combustion.

9. The method of claim 1 wherein the step of incinerating further comprises:

heating said oxygen rich atmosphere;

introducing said waste material; and separating said waste material in said oxygen rich atmosphere for at least a predetermined period of time.

*10. The method of claim 1 further comprising the step of shredding the waste material prior to the incinerating step.*

*11. The method of claim 1 further comprising the step of recovering excess energy from the firing step.*

*12. The method of claim 1 wherein the incinerating and firing steps occur on one of a batch, intermittent, and continuous duty cycle.*

*13. The method of claim 1 further comprising the step of suspending the waste material for a predetermined period of time during at least one of the incinerating and firing steps.*

*14. The method of claim 1 further comprising the step of suspending the waste material for a predetermined period of time using a cyclonic air flow pattern during at least one of the incineration and firing steps.*

*15. The method of claim 1 further comprising the step of heating the waste material prior to the incinerating step.*

*16. The method of claim 1 further comprising the step of disturbing residue that accumulates during at least one of the incinerating and firing steps.*

*17. The method of claim 1 further comprising the step of cooling the exhaust before releasing it into the atmosphere.*

*18. The method of claim 1 further comprising the step of electrostatically filtering the exhaust after the firing step.*

*19. The method of claim 1 further comprising the step of purifying the exhaust with a reducing catalyst after the firing step.*

*20. The method of claim 1 further comprising the step of purifying the exhaust with an oxidizing catalyst after the firing step.*

*21. The method of claim 1 further comprising the step of purifying the exhaust with a neutralizing module after the firing step.*

*22. The method of claim 1 collecting noncombustible materials resulting from the incinerating and firing steps.*

*23. A method for disposing a waste material comprising:*

*(a) incinerating said waste material in an oxygen rich atmosphere to produce ash and exhaust; and*

*(b) firing said exhaust in an oxygen starved atmosphere to produce a fired exhaust.*

*24. The method of claim 23 further comprising the step of agitating said waste material and ash during said incinerating step to increase incineration.*

*25. The method of claim 24 further comprising the step of agitating said neutralizing solution and mixing said fired exhaust with said neutralizing solution during said filtering step.*

*26. The method of claim 23 further comprising the step of cooling said fired exhaust.*

*27. The method of claim 23 further comprising the step of filtering said fired exhaust to remove particles.*

*28. The method of claim 23 further comprising the step of treating said fired exhaust to remove by-products of combustion contained in said fired exhaust.*

*29. The method of claim 23 wherein the step of incinerating further comprises using a non-stoichiometric combustion.*

*30. The method of claim 23 wherein the step of incinerating further comprises:*

*heating said oxygen rich atmosphere;*

*introducing said waste material; and*

*suspending said waste material in said oxygen rich atmosphere for at least a predetermined period of time.*

*31. The method of claim 23 further comprising the step of shredding the waste material prior to the incinerating step.*

*32. The method of claim 23 further comprising the step of recovering excess energy from the firing step.*

*33. The method of claim 23 wherein the incinerating and firing steps occur on one of a batch, intermittent, and continuous duty cycle.*

*34. The method of claim 23 further comprising the step of suspending the waste material for a predetermined period of time during at least one of the incinerating and firing steps.*

*35. The method of claim 23 further comprising the step of suspending the waste material for a predetermined period of time using a cyclonic air flow pattern during at least one of the incineration and firing steps.*

*36. The method of claim 23 further comprising the step of heating the waste material prior to the incinerating step.*

*37. The method of claim 23 further comprising the step of disturbing residue that accumulates during at least one of the incinerating and firing steps.*

*38. The method of claim 23 further comprising the step of cooling the exhaust before releasing it into the atmosphere.*

*39. The method of claim 23 further comprising the step of electrostatically filtering the exhaust after the firing step.*

*40. The method of claim 23 further comprising the step of purifying the exhaust with a reducing catalyst after the firing step.*

*41. The method of claim 23 further comprising the step of purifying the exhaust with an oxidizing catalyst after the firing step.*

*42. The method of claim 23 further comprising the step of purifying the exhaust with a neutralizing module after the firing step.*

*43. The method of claim 23 collecting noncombustible materials resulting from the incinerating and firing steps.*

* * * * *